Patented Jan. 31, 1950

2,496,226

UNITED STATES PATENT OFFICE 2,496,226

PRODUCTION OF DISPERSIONS OF REACTION PRODUCTS OF HALOGENATED PARAFFINS AND ALKALINE POLYSULFIDES

Johan Overhoff and Hendrik Willem Huyser, Amsterdam, Netherlands, assignors to Shell Development Company, San Francisco, Calif., a corporation of Delaware No Drawing. Application July 14, 1947, Serial No. 760,922. In the Netherlands July 15, 1941

Section 1, Public Law 690, August 8, 1946
Patent expires July 15, 1961

17 Claims. (Cl. 260—79.1)

The present invention relates to the production of stable dispersions of reaction products of halogenated paraffins and alkaline polysulfides and to the improved products thereby obtained.

Methods have been disclosed heretofore for the production of high molecular weight plastic reaction products by reacting a halogenated hydrocarbon, such as a di-halogen substituted paraffin, with an alkaline polysulfide, in an aqueous medium. By carrying out the reaction in the presence of a dispersing agent aqueous dispersions, or latices, resembling rubber latex are obtained. As dispersion agents such inorganic materials as magnesium hydroxide, obtained, for example, by the reaction of magnesium chloride with sodium hydroxide during the course of the reaction, have generally been employed. The dispersions thereby obtained are, however, generally handicapped by the presence of the dispersed reaction product therein in the form of relatively large grains or particle size. They are ordinarily stable only as long as the inorganic dispersion agent is present in relatively large amounts. Removal therefrom of the inorganic dispersion agent results in an immediate irreversible coagulation of the dispersed particles. Films formed from such dispersion are often highly unsatisfactory since upon evaporation of the aqueous medium therefrom a layer of crumbly character is generally formed lacking in a proper degree of adhesive power.

Utilization of dispersion agents of a more or less organic nature such as, for example, glue, soaps and the like, generally result in an unavoidable lack of uniformity of product and the presence therein of lumpy masses. Generally the dispersions so prepared can be freed of salt (NaCl) formed during the reaction, only with difficulty if at all. Due to the physical nature of a substantial part of the particles comprised therein, and the inability to effectively separate salt therefrom, coherent films possessing suitable characteristics for practical use can generally not be produced therefrom by such means as subjection to evaporation.

It has now been found that the above difficulties are obviated to at least a substantial degree and improved dispersions of stable character are obtained by reacting a di-halogen substituted paraffin with an alkaline polysulfide in an aqueous medium in the presence of a water soluble salt of a sulfuric acid ester.

The halogenated hydrocarbons used as starting material in the production of the stable dispersions in accordance with the invention comprise the di-halogenated paraffins from any available source. They may be obtained, for example, by the additional halogenation of olefins, the substitutive halogenation of paraffins, or the halogenation of hydrocarbon fractions comprising substantial amounts of olefins and/or paraffins. The suitable di-halogenated paraffins comprise the chlorine, bromine, and iodine derivatives of the paraffinic hydrocarbons. Illustrative of the class of di-halogenated paraffins employed are, for example, dichloromethane, dichloroethane, 1-chloro-3-bromopropane, ethylene-dibromide, the chlorinated hydrocarbons obtained by the subjection to additive chlorination of olefin-containing cracked hydrocarbon fractions, etc. Of the broad class of di-halogenated paraffins the di-halogen derivatives of the normally gaseous paraffins are preferred.

By the term "alkaline polysulfide" as used throughout this specification and claims is meant the alkali-, alkaline earth- and ammonium-polysulfides, as well as the polysulfides of organic bases. Illustrative of the broad class of suitable polysulfides are the polysulfides of sodium, potassium, calcium, strontium, barium, ammonia, triethanolamine, and the like.

The di-halogenated paraffin such as, for example, dichloroethane, is reacted with the alkaline polysulfide, such as, for example, sodium polysulfide, at a temperature ranging from room temperature to about 100° C. Temperatures in the range of from about 60° C. to about 80° C. are generally preferred. At temperatures below 60° C. the time of reaction is generally too long, whereas the utilization of temperatures substantially above 80° C. necessitates the use of elevated pressures. The use of a temperature of about 70° C. is particularly preferred. The di-halogenated paraffin and the alkaline polysulfide are reacted in aqueous medium in substantially equimolecular amounts. In a preferred method of carrying out the process a slight molar excess, for example, about $\frac{1}{10}$ mol excess, of the di-halogenated paraffin over the alkaline polysulfide present is employed. The alkaline polysulfide is generally added in the form of a solution, for example, a 0.5 mol aqueous solution. A sufficient amount of water as reaction medium is generally employed to maintain the concentration of the alkaline polysulfide between about 0.3 mol and 1 mol per liter of reaction mixture. It has been found that maintaining the concentration of the alkaline polysulfide substantially below the indicated value of 0.3 mol per liter of reaction mixture will often render more difficult a rapid or complete stratification of the product, or the separation by centrifuging of a clear salt solution therefrom. On the other hand maintaining the concentration of the alkaline polysulfide above about 1 mol per liter of reaction mixture will often occasion the formation of coarse particles in the resulting dispersion.

In order to obtain the dispersions of substantially improved characteristics of the present invention the reaction of the di-halogen substituted paraffin with the alkaline polysulfide is executed in the presence of a dispersion agent consisting of a water soluble salt of a sulfuric acid ester. Suitable salts comprise the alkali, alkaline earth and ammonium salts of the sulfuric acid esters. Dispersion agents employed comprise the water soluble salts of sulfuric acid esters derived from high molecular weight olefins and alcohols, particularly the water soluble salts of sulfuric acid esters derived from olefins and aliphatic alcohols having from 10 to 18 carbon atoms to the molecule. Examples of sulfuric acid esters the water soluble salts of which constitute particularly preferred dispersing agents comprise the sulfuric acid esters of the straight and branched chain decenes, hendecenes, dodecenes, tridecenes, tetradecenes, pentadecenes, hexadecenes, heptadecenes, octadecenes, decanols, hendecanols, dodecanols, tridecanols, tetradecanols, pentadecanols, hexadecanols, heptadecanols, octadecanols, and the corresponding unsaturated alcohols. The dispersion agents employed need not necessarily consist of but one salt of a sulfuric acid ester and a mixture consisting of two or more such salts may suitably be employed. A particularly desirable mixture of sulfuric acid ester salts comprises the mixed sulfuric acid ester salts obtained by treating with sulfuric acid under esterifying conditions an olefinic hydrocarbon fraction containing olefins having from 10 to 18 carbon atoms to the molecule, such as obtained, for example, by the cracking of paraffin wax, and saponifying the resulting mixed ester with a suitable alkaline earth, alkali or ammonium hydroxide to obtain therefrom a mixture of sulfuric acid esters of the olefins.

The amount of dispersion agent added to the reaction mixture may vary within the scope of the invention in accordance with the particular reactants and dispersion agent employed. In general, the addition of the dispersion agent in amounts less than about 5%, and often below about 3% by weight of the reaction mixture, will result in the attainment of dispersions possessing the improved characteristics. Greater amounts of the dispersion agents may be employed, however, within the scope of the invention. It has been found that relatively small amounts of the dispersion agents ranging, for example, from about 0.1 to about 1 per cent by weight, will usually suffice to obtain the desired results. Thus in the production of a dispersion by the interaction of di-chloroethane with sodium polysulfide in an aqueous medium, the addition of as little as 0.3% by weight of the aqueous reaction mixture of a dispersion agent consisting of the mixed sodium salts of the sulfuric acid esters obtained by esterifying a cracked olefinic-hydrocarbon fraction containing olefins having from 10 to 18 carbon atoms (resulting from the cracking of paraffin wax) has been found sufficient to result in a completely stable dispersion of excellent film-forming characteristics.

The reaction time employed will vary within the scope of the invention depending upon the nature of the reactants and the conditions employed. Reaction times ranging from about $\frac{1}{2}$ to about 5 hours, and generally from about 1 to about 2 hours, have been found satisfactory.

The reaction mixture obtained under the above-defined conditions is subjected to stratification in the reaction zone, or in a separate separating zone, to form a clear supernatant layer consisting essentially of aqueous sodium chloride solution and a whitish lower layer comprising the di-halogenated paraffin-alkaline polysulfide reaction product. Without intending to limit the scope of the invention by any theory advanced herein to set forth more fully the nature of the invention, it is believed that the ability to stratify the reaction mixture is due to the fact that the dispersed particles of high molecular weight reaction product are in a reversible coagulated state in the aqueous medium in the presence of the salt concentration prevailing therein. Upon dilution of the reaction mixture by the addition thereto of copious amounts of water no stratification appears to take place. Whereas the restoration of the concentration of salt (NaCl) therein to that prevailing in the reaction mixture generally obtained again enables stratification into a clear aqueous salt layer and a lower layer comprising the high molecular weight reaction products.

The bottom layer separated in the stratification step comprising the high molecular weight reaction product in admixture with some residual aqueous salt solution is subjected to a further salt separating step comprising, for example, centrifuging. In the centrifuging operation there is separated a clear aqueous salt solution containing substantially all of the salt which remained in the lower layer separated in the stratification step from a pasty mass comprising the high molecular weight di-halogenated paraffin-alkaline polysulfide reaction product free of any substantial amount of salt (NaCl). Water is added to the pasty high molecular weight product thus obtained and the mixture stirred. The amount of water added may vary within the scope of the invention. In general, an amount of water equal to about 2 to 3 times the volume of the pasty reaction product obtained has been found suitable. Upon stirring the mixture there is obtained a milky aqueous dispersion of the high molecular weight reaction product possessing unusually pronounced stability and having a particle size in the range of from about 0.1µ to about 1µ. The resulting dispersion maintains its stability for months without any substantial degree of precipitation.

A particular advantage of the process of the invention is the obtaining of aqueous dispersions of the high molecular weight reaction product of a di-halogenated paraffin and an alkaline polysulfide which not only possess unusual stability but which are free of any substantial amount of salt or other undesirable reaction product detrimental to a full realization of the advantages inherent in the desired reaction product.

The dispersions obtained in accordance with the invention are free of the disadvantages inherent in latices of the reaction product of a halogenated hydrocarbon and a polysulfide as obtained by methods disclosed heretofore. Thus dispersions having a solid content of about 40% which are capable of dilution with any desired ratio of water, to result in dispersions which are likewise stable are readily obtained in accordance with the process of the invention. Upon evaporation, the latices of the invention result in the obtaining of coherent, elastic films of high quality possessing good adhesive properties.

Of a great number of protective colloids and dispersion agents which were investigated, comprising such materials as metal hydroxides, bentonite, glue, gum, casein, mineral oil sulphonates, salts of alkylated naphthalene sulphonic acids, salts of lignin sulphonic acids, resinates, fatty acid salts, Turkey red oil, oleic acid ester of a water soluble alcohol, and the sulfuric acid ester salts derived from olefins and alcohols employed in the process of the invention, only the last named, were found to be suitable for the preparation of highly stable, finely divided, dispersed latices of high molecular weight reaction products of a di-halogen substituted paraffin and an alkaline polysulfide.

Additional stabilizing agents, fillers, vulcanizing agents, dyes, etc. may be added to the dispersions obtained in accordance with the invention. The improved dispersions are of value as adhesives suitable for glueing of leather, glass, rubber and the like, and as impregnating and water proofing agents for such materials as textiles, paper, wood and the like. They are employed to form protective films upon stone, wood, metal, and the like. The dispersions may be subjected to coagulation by conventional means and the resulting plastic mass, optionally in the presence of additional ingredients added during, before, or after coagulation, subjected to any suitable compounding, shaping, forming, vulcanizing, or like operation. The plastic coagulated mass thus obtained may be combined with plastics, elastomers, polymers, resins, etc., from any other suitable source, to modify the properties thereof. The dispersions may also be used as fungicides.

The following example is illustrative of the substantially improved dispersions obtained in accordance with the invention:

Example

In a series of 14 separate and independent operations 0.11 mol of dichloroethane was reacted with 0.1 mol sodium polysulfide in about 300 cc. of water. All operations were executed under substantially identical conditions with the exception that a different dispersion agent was employed in each experiment. The nature and amount of the dispersion agent employed, as well as the character of the dispersion obtained, in each operation is indicated in the following table:

| Dispersion Agent Added | Quality of Dispersion |
|---|---|
| 2.5 cc. of a 24% aqueous solution of sodium salts of sulfuric acid esters of mixed $C_{10}$ to $C_{18}$ olefines. | Stable. Finely dispersed. |
| 3.0 cc. of a 20% aqueous solution of sodium salts of sulfuric acid esters of mixed $C_6$ to $C_9$ olefins. | Unstable. Not uniform. Contains substantial amount of lumps in addition to fine particles. |
| 2 g. of sodium oleate | Unstable. Lumpy. |
| 2.5 g. of oleic acid ester of a water soluble alcohol having 2—OH groups and a plurality of ether oxygen atoms. Known by the trade name of "Emulphoor A." | Unstable. Coarse particles. |
| 2 g. of sodium salt of octadecane naphthalene sulphonic acid. | Unstable. Lumpy. |
| 2 g. of sodium salt of dodecane naphthalene sulphonic acid. | Do. |
| 1 g. of mineral oil sulphonates | Do. |
| 2 g. of a sulfonium compound having the approximate formula: $$C_{1-3}\diagdown C-SO_4CH_3 \diagup C_{10-18}$$ | Do. |
| 1 g. Sodium naphthenate | Do. |
| 2 g. Sodium rosinate | Do. |
| 2 cc. of lignin sulphonic acid solution (10% concentration). | Unstable. Very coarse particles. |
| 0.5 g. glue | Unstable. Unable to separate salt by-product by centrifuging. |
| 1 g. casein | Unstable. Centrifuged mass not dispersable in water. |
| 5 g. Turkey-red oil | Unstable. Lumpy and does not lend itself to separation by centrifuging. |

We claim as our invention:

1. The process for the production of finely divided, stable dispersions of the high molecular weight reaction products obtained by the interaction of dichloroethane with sodium polysulfide which comprises executing said reaction in an aqueous medium in the presence of a sodium salt of a sulfuric acid ester of a monohydric aliphatic alcohol having ten to eighteen carbon atoms to the molecule.

2. The process for the production of finely divided, stable dispersions of the high molecular weight reaction products obtained by the interaction of dichloroethane with sodium polysulfide which comprises executing said reaction in an aqueous medium in the presence of an alkali metal salt of a sulfuric acid ester of a monohydric aliphatic alcohol having ten to eighteen carbon atoms to the molecule.

3. The process for the production of finely divided, stable dispersions of the high molecular weight reaction products obtained by the interaction of dichloroethane with sodium polysulfide which comprises executing said reaction in an aqueous medium in the presence of a water soluble salt of a sulfuric acid ester of a monohydric aliphatic alcohol having ten to eighteen carbon atoms to the molecule.

4. The process for the production of finely divided, stable dispersions of the high molecular weight reaction products obtained by the interaction of dichloroethane with sodium polysulfide which comprises executing said reaction in an aqueous medium in the presence of a dispersion agent consisting essentially of a mixture of water soluble salts of sulfuric acid esters of monohydric aliphatic alcohols having ten to eighteen carbon atoms to the molecule derived from olefinic hydrocarbons having from ten to eighteen carbon atoms to the molecule.

5. The process for the production of finely divided, stable dispersions of the high molecular weight reaction products obtained by the interaction of dichloroethane with sodium polysulfide which comprises executing said reaction in an aqueous medium in the presence of a dispersion agent consisting essentially of a mixture of sodium salts of sulfuric acid esters of monohydric aliphatic alcohols having from ten to eighteen carbon atoms to the molecule derived from olefinic hydrocarbons having from ten to eighteen carbon atoms to the molecule.

6. The process for the production of finely divided, stable dispersions of the high molecular weight reaction products obtained by the interaction of dichloroethane with sodium polysulfide which comprises executing said reaction in an aqueous medium in the presence of a water soluble salt of a sulfuric acid ester of a monohydric aliphatic alcohol derived from an olefinic hydrocarbon having from ten to eighteen carbon atoms to the molecule.

7. The process for the production of finely divided, stable dispersions of the high molecular weight reaction products obtained by the reaction of a dichlor-substituted paraffin with sodium polysulfide which comprises executing said reaction in an aqueous medium in the presence of a sodium salt of a sulfuric acid ester of a monohydric aliphatic alcohol having ten to eighteen carbon atoms to the molecule.

8. The process for the production of finely divided, stable dispersions of the high molecular weight reaction products obtained by reacting a dichlor-substituted paraffin hydrocarbon with sodium polysulfide which comprises executing said reaction in an aqueous medium in the presence of an alkali metal salt of a sulfuric acid ester of a monohydric aliphatic alcohol having ten to eighteen carbon atoms to the molecule derived from an olefin.

9. The process for the production of finely divided, stable dispersions of the high molecular weight reaction products obtained by reacting a dichlor-substituted paraffin hydrocarbon with sodium polysulfide which comprises executing said reaction in an aqueous medium in the presence of a water soluble salt of a sulfuric acid ester of a monohydric aliphatic alcohol having from ten to eighteen carbon atoms to the molecule derived from an olefin.

10. The process for the production of finely divided, stable dispersions of the high molecular weight reaction products obtained by reacting a dichlor-substituted paraffin hydrocarbon with sodium polysulfide which comprises executing said reaction in an aqueous medium in the presence of a dispersion agent consisting essentially of water soluble salts of mixed sulfuric acid esters of monohydric aliphatic alcohols having from ten to eighteen carbon atoms to the molecule derived from olefinic hydrocarbons having from ten to eighteen carbon atoms to the molecule.

11. The process for the production of finely divided, stable dispersions of the high molecular weight reaction products obtained by reacting a di-halogen substituted paraffin with sodium polysulfide which comprises executing said reaction in an aqueous medium in the presence of a sodium salt of a sulfuric acid ester of a monohydric aliphatic alcohol having from ten to eighteen carbon atoms to the molecule derived from an olefin.

12. The process for the production of finely divided, stable dispersions of the high molecular reaction products obtained by reacting a di-halogen substituted paraffin with an alkaline polysulfide which comprises executing said reaction in an aqueous medium in the presence of a sodium salt of a sulfuric acid ester of a monohydric aliphatic alcohol having from ten to eighteen carbon atoms to the molecule derived from an olefin.

13. The process for the production of finely divided, stable dispersions of the high molecular reaction products obtained by reacting a di-halogen substituted paraffin with an alkaline polysulfide which comprises executing said reaction in an aqueous medium in the presence of an alkali metal salt of a sulfuric acid ester of a monohydric aliphatic alcohol having from ten to eighteen carbon atoms to the molecule derived from an olefin.

14. The process for the production of finely divided, stable dispersions of the high molecular reaction products obtained by reacting a di-halogen substituted paraffin with an alkaline polysulfide which comprises executing said reaction in an aqueous medium in the presence of a dispersion agent consisting essentially of a water soluble salt of a sulfuric acid ester of a monohydric aliphatic alcohol having from ten to eighteen carbon atoms to the molecule derived from olefinic hydrocarbons having from ten to eighteen carbon atoms to the molecule.

15. The process for the production of finely divided, stable dispersions of the high molecular reaction products obtained by reacting a di-halogen substituted paraffin with an alkaline polysulfide which comprises executing said reaction in an aqueous medium in the presence of a dispersion agent consisting essentially of sodium salts of a mixture of sulfuric acid esters of monohydric aliphatic alcohols having from ten to eighteen carbon atoms to the molecule derived from olefinic hydrocarbons having from ten to eighteen carbon atoms to the molecule.

16. The process for the production of finely divided, stable dispersions of the high molecular weight reaction products obtained by reacting a di-halogen substituted paraffin with an alkaline polysulfide which comprises reacting a molal excess of said di-halogen substituted paraffin with said alkalin polysulfide in an aqueous medium in the presence of a water soluble salt of a sulfuric acid ester of a monohydric aliphatic alcohol having from ten to eighteen carbon atoms to the molecule derived from an olefin.

17. The process for the production of finely divided, stable dispersions of the high molecular weight reaction products obtained by reacting a di-halogen substituted paraffin with an alkaline polysulfide which comprises reacting a molal excess of said di-halogen substituted paraffin with said alkaline polysulfide in an aqueous medium in the presence of a water soluble salt of a sulfuric acid ester of a monohydric aliphatic alcohol having from ten to eighteen carbon atoms to the molecule derived from an olefin and adding said alkaline polysulfide to said reaction mixture in an amount ranging from about 0.3 mol to about 1 mol of alkaline polysulfide per liter of reaction mixture.

JOHAN OVERHOFF.
HENDRIK WILLEM HUYSER.

(References on following page)

REFERENCES CITED

The following references are of record in the file of this patent:

UNITED STATES PATENTS

| Number | Name | Date |
|---|---|---|
| 2,386,287 | Blanco et al. | Oct. 9, 1945 |
| 2,406,260 | Ryden | Aug. 20, 1946 |

FOREIGN PATENTS

| Number | Country | Date |
|---|---|---|
| 452,215 | Great Britain | Aug. 18, 1936 |